(12) United States Patent
Kawamura (10) Patent No.: US 8,891,166 B2
(45) Date of Patent: Nov. 18, 2014

(54) POLARIZATION DEPENDENT TYPE OPTICAL ISOLATOR

(75) Inventor: Takuya Kawamura, Matsudo (JP)

(73) Assignee: Seikoh Giken Co., Ltd., Chiba (JP)

( * ) Notice: Subject to any disclaimer, the term of this patent is extended or adjusted under 35 U.S.C. 154(b) by 436 days.

(21) Appl. No.: 12/988,234

(22) PCT Filed: Aug. 6, 2009

(86) PCT No.: PCT/JP2009/063933
§ 371 (c)(1),
(2), (4) Date: Oct. 15, 2010

(87) PCT Pub. No.: WO2010/016541
PCT Pub. Date: Feb. 11, 2010

(65) Prior Publication Data
US 2011/0038046 A1    Feb. 17, 2011

(30) Foreign Application Priority Data
Aug. 6, 2008    (JP) .................................. 2008-202648

(51) Int. Cl.
*G02B 27/28*    (2006.01)
*G02B 6/27*    (2006.01)
*G02F 1/09*    (2006.01)

(52) U.S. Cl.
CPC .............. *G02B 6/2746* (2013.01); *G02B 27/28* (2013.01); *G02F 1/093* (2013.01); *G02F 2203/07* (2013.01)
USPC .................................................... 359/484.03

(58) Field of Classification Search
None
See application file for complete search history.

(56) References Cited

U.S. PATENT DOCUMENTS

| | | | |
|---|---|---|---|
| 4,548,478 A | 10/1985 | Shirasaki | |
| 5,557,692 A * | 9/1996 | Pan et al. | 385/11 |
| 5,774,264 A * | 6/1998 | Konno et al. | 359/484.03 |
| 5,930,038 A * | 7/1999 | Swan | 359/484.03 |
| 6,014,475 A * | 1/2000 | Frisken | 385/11 |
| 6,330,117 B1 | 12/2001 | Seo | |
| 6,717,730 B2 * | 4/2004 | Terahara et al. | 359/484.02 |
| 2002/0060843 A1* | 5/2002 | Huang et al. | 359/484 |
| 2002/0110307 A1* | 8/2002 | Huang et al. | 385/11 |

FOREIGN PATENT DOCUMENTS

| | | |
|---|---|---|
| JP | 57-100410 A | 6/1982 |
| JP | 61-45219 A | 3/1986 |
| JP | 6-118345 A | 4/1994 |
| JP | 2000039590 A | 2/2000 |
| JP | 2002-502504 A | 1/2002 |
| JP | 2004045881 A | 2/2004 |
| JP | 2007183419 A | 7/2007 |

* cited by examiner

*Primary Examiner* — Derek S Chapel
(74) *Attorney, Agent, or Firm* — Fish & Richardson P.C.

(57) ABSTRACT

Provided are a non-reciprocal unit used for a polarization dependent type optical isolator and a polarization dependent type optical isolator that are simple in structure, can prevent damages due to light and heat and can obtain a high extinction ratio. In a polarization dependent type optical isolator, an input side lens (first lens) (5), a first birefringence unit (7), a Faraday rotator (9), a second birefringence unit (11) and an output side lens (second lens) (15) are arranged from the input side to the output side. The polarization dependent type optical isolator (1) is connected with optical fibers (3, 17) on the input and output sides, respectively, wherein a wedge angle ($\theta_1$) of the first birefringence unit (7) is different from a wedge angle ($\theta_2$) of the second birefringence unit (11).

1 Claim, 4 Drawing Sheets

FIG. 1A

FORWARD DIRECTION

FIG. 1B

BACKWARD DIRECTION

POLARIZATION DEPENDENT TYPE OPTICAL ISOLATOR

TECHNICAL FIELD

The present invention relates to a non-reciprocal unit used for a polarization dependent type optical isolator and a polarization dependent type optical isolator, which are used for optical communications, optical measurements, optical machining and the like.

BACKGROUND ART

In Patent Reference 1, a structure that is provided with a Faraday rotator between a first birefringence unit provided at an input side and a second birefringence unit provided at an output side is publicly known as a polarization non-dependent type optical isolator.

In the optical isolator of Patent Reference 1, ordinary light and extraordinary light that are separated by the first birefringence unit are both focused onto a core end face of an output side optical fiber.

A case in which polarizers are provided at the input side and output side of a Faraday rotator such that only light with a polarization plane in a specified direction is transmitted and light with a polarization plane in another direction is absorbed is publicly known as a polarization dependent type isolator.

[Patent Document 1] Japanese Unexamined Patent Application, First Publication No. S57-100410

DISCLOSURE OF THE INVENTION

Problems to be Solved by the Invention

However, as light that is to be propagated through an optical fiber, high power output polarized light such as laser light or the like may be used; for example, being polarized light with an output of 1 W to 1 kW, in contrast with the output of ordinary communications light (0.1 mW to 100 mW).

With a polarization dependent type isolator that uses a related art polarizer, high precision in orientation of the polarizer is required with this high power polarized light. If there is even a slight angular error, the polarizer absorbs light that passes through the polarizer with a different polarization plane from the specified polarization plane. Therefore, in a system that transmits light with high light intensity from an optical fiber laser or the like, the polarizer reaches a high temperature and may be damaged.

Alternatively, in the polarization non-dependent type optical isolator of Patent Reference 1, it is not possible to select and propagate just the polarized light of a specified polarization plane. Therefore, there is a problem in that a high extinction ratio may not be obtained (the ratio of elimination of polarized light of the specified polarization plane compared to the orthogonal polarization).

Accordingly, an object of the present invention is to provide a non-reciprocal unit used for a polarization dependent type optical isolator and a polarization dependent type optical isolator that, with a simple constitution, are capable of preventing damage due to heating even when high power polarized light is used and capable of providing a high extinction ratio.

Means for Solving the Problems

A first aspect of the invention is a non-reciprocal unit used for a polarization dependent type optical isolator, including: a first birefringence unit; a second birefringence unit; and a Faraday rotator disposed between the first birefringence unit and the second birefringence unit, wherein refraction angles of the first birefringence unit and the second birefringence unit are different.

A second aspect of the invention is a polarization dependent type optical isolator in which the non-reciprocal unit used for a polarization dependent type optical isolator relating to the first aspect is disposed between an input unit formed with an optical component and an output unit formed with an optical component.

Effects of the Invention

According to the first aspect, because the first and second birefringence units with different refraction angles are used, the constitution is simple. Furthermore, because birefringence is utilized and there is no absorption of light as in a polarization plate, damage due to heating is prevented even when high power polarized light is used as the light to be propagated. Polarized light (extraordinary light) in the polarization plane orthogonal to the main polarized light (ordinary light) can be separated and removed by being emitted at a position offset from an emission position of the ordinary light, by the refraction angles of the first and second birefringence units being varied. Therefore, a high extinction ratio may be obtained and stable polarized light provided. The main polarized light may be the extraordinary light, with the ordinary light being emitted at a position offset from the emission position of the extraordinary light and removed.

In the first aspect, the refraction angles of the first and second birefringence units may be made different by a refractive index difference between ordinary light and extraordinary light of the first birefringence unit being different from a refractive index difference between ordinary light and extraordinary light of the second birefringence unit.

The refraction angles of the first and second birefringence units may be made different simply by making materials of the first and second birefringence units different. Therefore, the constitution is simple and fabrication costs may be kept down. To obtain a high extinction ratio, it is preferable if the refractive index difference between ordinary light and extraordinary light of the first birefringence unit and the refractive index difference between ordinary light and extraordinary light of the second birefringence unit are large.

In the first aspect, the refraction angles of the first and second birefringence units may be made different by a sum of angles formed by input faces and output faces of birefringent members constituting the first birefringence unit being different from a sum of angles formed by input faces and output faces of birefringent members constituting the second birefringence unit.

When the sum of angles formed by the input faces and output faces of the birefringent members constituting the first birefringence unit and the sum of angles formed by the input faces and output faces of the birefringent members constituting the second birefringence unit are simply made different, the constitution is simple and fabrication costs may be kept down.

In the first aspect, it is preferable, if a difference between the ordinary light refraction angle and the extraordinary light refraction angle in the first birefringence unit is $\Delta\Phi 4$ and a difference between the ordinary light refraction angle and the extraordinary light refraction angle in the second birefringence unit is $\Delta\Phi 2$, $\Delta\Phi 1$ and $\Delta\Phi 2$ are different by at least $0.05°$.

In the first birefringence unit and the second birefringence unit, combinations of birefringent members with various refraction angles may be used in combination, and the extinction ratio is set to 10 dB or above with these combinations. Thus, the quality of output light is enhanced, the light may be narrowed down closer to the diffraction limit, and the conversion efficiency of a wavelength conversion to second-order waves (with half the wavelength) is enhanced.

Further, stable polarized light with an extinction ratio of the order of 20 to 40 dB, as is required in devices that use polarization-maintaining and Absorption reducing fibers, may be easily obtained.

In the first aspect, it is preferable to dispose a wavelength filter or an antireflection optical film with wavelength selectivity on the optical path.

Light produced by optical fiber amplifiers, optical fiber lasers and the like, such as excitation light, parasitic oscillation light and the like, may be removed by introducing a filter that selects by wavelength or an antireflection optical film with wavelength selectivity into the optical path.

In the first aspect, a wavelength plate may be disposed on the optical path. When the wavelength plate is introduced into the optical path, the polarization direction changes to the orthogonal direction and system losses may be prevented from deteriorating if a device with polarization dependence is disposed at a later stage.

In the first aspect, it is preferable to dispose a refraction unit for correction on the optical path and correct an angle of output light rays with this refraction unit for correction.

Adjustment of angles of the ordinary light and extraordinary light may be made easier by providing a third refraction unit for correction.

In the first aspect, it is preferable if the refraction unit for correction is formed with a birefringent member.

When the refraction unit for correction is a birefringent member, a member of the same material as the first and second birefringence units may be used, and common use of the material is enabled. Therefore, fabrication costs may be lowered.

In the first aspect, it is preferable if an input face and an output face of the Faraday rotator are not parallel.

When the input face and output face of the Faraday rotator are not parallel, the Faraday rotator may be utilized for angle adjustment, serving as the third reflection unit for correction. Therefore, the number of components may be reduced and costs may be lowered.

According to the second aspect, a polarization dependent type optical isolator that realizes the same effects as the first aspect may be provided.

In addition, if optical fibers, lenses or the like are used as the input unit and output unit, by adding a lens and an optical fiber, only light inputted into the core of an optical fiber is used and a higher extinction ratio can be obtained.

In the second aspect, it is preferable to dispose optical waveguides at respective output positions of ordinary light and extraordinary light.

When optical waveguides are provided, for example, optical fibers that output the ordinary light and the extraordinary light, respectively, to outside the device serve as optical waveguide structures that constitute the output unit. Therefore, the light is not kept enclosed inside the device and there is an effect of preventing a rise in temperature of the device.

Further, by measuring and monitoring intensities of the light emitted to outside the device, operational conditions of an optical fiber laser device that is used may be ascertained, and may be used for failure warnings and failure reports, stabilization of light amount levels and so forth.

EXPLANATION OF REFERENCE NUMERALS

1 Polarization dependent type optical isolator
3 Input side optical fiber
5 First lens (input side lens)
7 First birefringence unit
9 Faraday rotator
11 Second birefringence unit
13 Refraction unit for angle correction
15 Second lens (output side lens)
17 Output side optical fiber
21 Non-reciprocal unit used for the polarization dependent type optical isolator
101 Wavelength filter
102 Wavelength plate Preferred Mode For Carrying Out The Invention Herebelow, embodiments of the present invention are described with reference to the attached drawings. Firstly, a first embodiment of the present invention is described with reference to FIG. 1A-FIG. 1C.

Figure 1A:
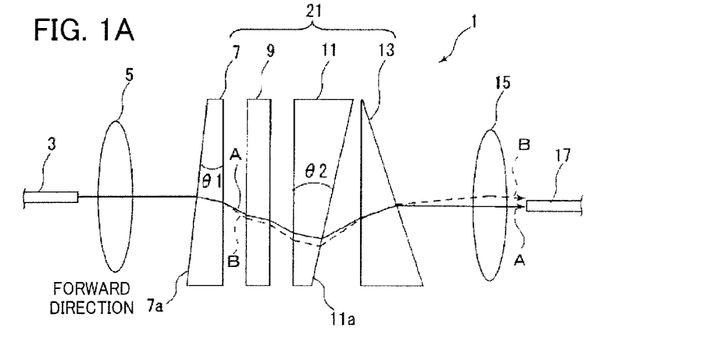
FIG. 1A is a layout diagram of structural members of a polarization dependent type optical isolator relating to a first embodiment, illustrating the operation of input light.

A polarization dependent type optical isolator 1 relating to the first embodiment is structured by an input side optical fiber 3, a first lens (input side lens) 5, an output side optical fiber 17, a second lens 15 (output side lens), and a non-reciprocal unit 21 used for the polarization dependent type optical isolator that is disposed between the first lens 5 and the second lens 15.

The non-reciprocal unit 21 used for the polarization dependent type optical isolator is provided with, from the input side to the output side, a first birefringence unit 7, a Faraday rotator 9, a second birefringence unit 11, and a unit for angle correction 13.

In the present embodiment, laser light is propagated from the input side optical fiber 3 to the output side optical fiber 17. Polarization-maintaining and Absorption reducing (PANDA) fibers are used for each of these optical fibers.

The combination of an optical fiber and a lens may be at only one of the input and the output.

Figure 1B:
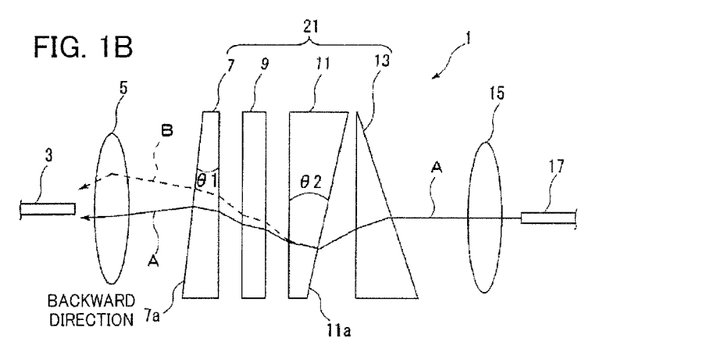
FIG. 1B is a layout diagram of the structural members, illustrating the operation of return light.

Although convex lenses are illustrated in FIGS. 1A and 1B, any optical element that features a focusing operation may be used, such as a structure that reflects and focuses light from a concave mirror, a Fresnel lens, a refractive index distribution type lens in which the refractive index of central portions is higher than the refractive index of peripheral edge portions, or the like.

The first and second birefringence units 7 and 11 are both wedge-type birefringent crystals. Rutile, calcite or the like is used. The first birefringence unit 7 is disposed with a taper face 7a of the wedge facing the input side, and the second birefringence unit 11 is disposed with a taper face 11a facing the output side.

In these optical components such as birefringent members and the like, angles formed by input faces and output faces thereof are referred to as wedge angles θ. A wedge angle θ1 of the first birefringence unit 7 and a wedge angle θ2 of the second birefringence unit 11 are different. In the present embodiment, θ1 is 4° and θ2 is 8°. This angle θ2 may be structured by two 4° birefringent members. As other specific examples, θ1 may be 4° and θ2 7°, and θ1 may be 4° and θ2 6°. Conversely, θ1 may be 8° and θ2 4°

Because the wedge angles θ are different, only light of a desired polarization direction is transmitted to a predetermined position, and a polarization dependent type optical isolator may be constituted.

When the wedge angles θ1 and θ2 are different, the ratio between ordinary light and extraordinary light, that is, the extinction ratio, may be raised. The larger the difference between the wedge angles θ1 and θ2, the higher the extinction ratio may be raised. The extinction ratio may be calculated with the following expression.

$$\text{Extinction ratio (dB)} = -10 \log(\exp(-(\Delta X/W)^2))$$ Expression 1

In expression 1, ΔX represents a positional offset amount between the ordinary light and the extraordinary light at an optical fiber end face, and is expressed by the following expression 2. W represents a mode field radius.

$$\Delta X = f \times \tan|\Delta\phi 2 - \Delta\phi 1|$$ Expression 2

Here, f represents a focusing distance of the lens, Δφ1 represents the difference between a refraction angle of ordinary light φ1o and a refraction angle of extraordinary light φ1e in the first birefringence unit, and Δφ2 represents the difference between a refraction angle of ordinary light φ2o and a refraction angle of extraordinary light φ2e in the second birefringence unit.

If, as an example, the birefringent crystal is rutile ($TiO_2$), the lens focusing distance is 4 mm and the mode field diameter (2 W) is 5 μm, then if the difference between Δφ1 and Δφ2 is 0.05°, the extinction ratio is 8.5 dB.

In this case, because both the first and second birefringence portions have wedge angles of at least 0.3°, the isolation may be 20 dB or more. When the isolation is 20 dB or more, a ratio by which light is amplified with an optical fiber laser, which is an example of application of the polarization dependent type optical isolator of the present invention, is around 20 dB, and improvements in characteristics such as an improvement of the extinction ratio and the like are enabled.

When the present device has an isolation of 20 dB, a light amount that returns to a preceding stage of the present device is −20 dB (1/100) of that in the forward direction. Therefore, even if an unillustrated optical amplifier at a preceding stage has an amplification of 20 dB, the light amount is the same as light inputted to the amplifier, and the optical fiber laser operates stably.

In the present embodiment, the birefringent crystal is rutile ($TiO_2$), the focusing distance of the lens is 1.8 mm, the mode field diameter (2 W) is 5 μm, the wedge angle θ1 is 4° and θ2 is 8°. Therefore, the extinction ratio and isolation are both at least 40 dB, and thoroughly excellent characteristics may be obtained.

The refraction unit for angle correction 13 is a prism and corrects an angle of light rays incident on the output side lens 15. It is sufficient that the refraction unit for angle correction 13 be a transparent body with a different refraction index to empty space. For example, an optical glass such as quartz glass, Bk7 or the like, or a plastic or the like may be used.

Further, for infrared wavelengths, germanium, silicon and the like are transparent and may be used.

Further yet, birefringent materials such as rutile, $YVO_4$, fluorite and the like may be used as the refraction unit for angle correction 13.

In a polarizer of a type that separates two orthogonal polarizations by using a birefringent material, because there is no absorption of the light, there is no danger of heating and stability is very high. Therefore, stable use is possible even in applications that input light with a large light intensity such as 1 W or more.

That is, if polarizers with the function of absorbing polarized light orthogonal to the transmitted direction were used in the polarization dependent type optical isolator 1 before and after the Faraday rotator 9—for example, polymer films that have been stretched, members that have been stretched after having metal particles deposited thereon, or the like—then the transmitted direction polarized light would have high transmissibility but light polarized in the direction orthogonal to the transmitted direction would be absorbed in the polarizers and the absorbed light converted into heat. With an intensity of inputted light of 10 W and an extinction ratio of the input light of 20 dB, the intensity of light in the polarization direction that is absorbed would be 0.1 W. A polarizer of stretched glass absorbing light at 0.1 W would reach a temperature exceeding 100° C., and there would be a risk of damage or severe loss of functionality occurring. A polarizer formed of a polymer film would be melted by heating, and there would be a danger of fire or the like.

In contrast, in the present embodiment, the first birefringence unit 7 and the second birefringence unit 11 are provided before and after the Faraday rotator 9, and polarizers that absorb the above-mentioned polarized light orthogonal to the transmitted direction are not used. Therefore, there is no danger of fire and stability is extremely high.

Next, operations and effects of the polarization dependent type optical isolator 1 relating to the first embodiment are described.

Figure 1C:
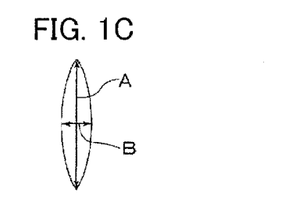
FIG. 1C is a diagram explaining the extinction ratio.

Ordinarily, as illustrated in FIG. 1C, laser light includes light with a polarization plane B (the extraordinary light) orthogonal to light of a specified polarization plane A (the ordinary light). In the present embodiment, this extraordinary light B is removed and the extinction ratio is raised.

As illustrated in FIG. 1A, high power output polarized light outputted from the input side optical fiber 3 is separated into the ordinary light A and the extraordinary light B by the first birefringence unit 7. The ordinary light A and extraordinary light B have their polarization planes rotated by the Faraday rotator 9. The ordinary light A is refracted by the second birefringence unit 11 and has its refraction angle adjusted by the unit for angle correction 13, and is then focused onto the core end face of the output side optical fiber 17 by the second lens 15.

Meanwhile, because the wedge angle θ2 of the second birefringence unit 11 is different from the wedge angle θ1 of the first birefringence unit 7, after the extraordinary light B has passed through the Faraday rotator 9, the ordinary light A and the extraordinary light B that have passed through the second birefringence unit 11 are not parallel but the extraordinary light B forms a different angle from the ordinary light A.

Therefore, when the extraordinary light B is incident on the second lens 15, which focuses the ordinary light A on the core end face of the output side optical fiber 17, the extraordinary light B with a different input angle from the ordinary light A is emitted toward a position that is offset from the core end face of the output side optical fiber 17. Thus, the extraordinary light B may be excluded from being inputted to the output side optical fiber 17, and the extinction ratio B/A may be raised. In the present embodiment, the extinction ratio may be raised to 40 dB or above.

In the case of return light with the opposite direction of progress to the light described above, as illustrated in FIG. 1B, the ordinary light A and extraordinary light B are refracted through respectively different refraction angles by the second birefringence unit 11, the polarization planes thereof are simultaneously rotated when passing through the Faraday rotator 9, and then the ordinary light A and extraordinary light B are refracted by different refraction angles at the first birefringence unit 7.

The ordinary light A and extraordinary light B are emitted at respectively different angles and positions, which are different from the position and angle of the input light in FIG. 1A. Thus, because the return light does not coincide with the input light, the return light does not return to the source position.

Herein, the term "refraction angle" does not mean the refraction angle at each boundary face of the input faces and output faces, but means the refraction angle of overall the birefringence unit which is the first birefringence unit 7 or the second birefringence unit 11.

Thus, if the first birefringence unit 7 is structured by a single wedge type prism, the total of respective refraction angles at the input face and the output face is the refraction angle of the first birefringence unit 7.

If the first birefringence unit 7 is formed of a plural number of prisms, the refraction angle is a total combined angle of the respective refraction angles of the plural prisms.

According to the present embodiment, as described above, the optical isolator function may be provided without components that rotating the polarized light other than the Faraday rotator 9, and a reduction in the number of components is enabled. In addition, as the birefringence members to be employed, rutile prisms that are members with crystal orientations which are used in ordinary optical isolators may be employed. Therefore, special jigs and special measurement devices are unnecessary, which contributes to a reduction in costs.

On the other hand, return light that is outputted from the output side optical fiber 17 is separated into ordinary light A and extraordinary light B by the second birefringence unit 11 as illustrated in FIG. 1B, and the ordinary light A and extraordinary light B have their polarization planes rotated by the Faraday rotator 9. The ordinary light A is refracted by the first birefringence unit 7 and is emitted by the first lens 5 toward a position that is offset from the core end face of the input side optical fiber 3. Similarly, the extraordinary light B is refracted by the first birefringence unit 7 and is emitted by the first lens 5 toward a position that is offset from the core end face of the input side optical fiber 3. Thus, the return light is prevented from being taken into the input side optical fiber 3.

According to the polarization dependent type optical isolator 1 relating to the present embodiment, the constitution is substantially the same as an ordinary polarization non-dependent type optical isolator, with only the first and second birefringence units 7 and 11 with the different refraction angles being used. Therefore, the constitution is simple.

The respective refraction angles of the first birefringence unit 7 and the second birefringence unit 11 may be altered by changing the wedge angles or birefringence values of the birefringent portions of the first birefringence unit 7 and the second birefringence unit 11.

Because the first birefringence unit 7 and second birefringence unit 11 with different refraction angles from one another are used, a constitution that, rather than absorbing ordinary light and extraordinary light of the polarized light, can easily release light energy to the outside rather than enclosing the light energy inside the device of the present invention may be formed. Therefore, local temperature rises, damage to the device by light energy and the like may be prevented.

Even if the wedge angles are not different, the same effects may be provided if the differences in refractive index between ordinary light and extraordinary light are different between the first birefringence unit 7 and the second birefringence unit 11, because the refraction angles are different. Specifically, it is sufficient to vary the materials of the first birefringence unit 7 and the second birefringence unit 11. For example, rutile may be used for the first birefringence unit and $YVO_4$, quartz or the like used for the second birefringence unit.

These materials may be combined in any combination provided the combinations of materials have different birefringence values.

According to the polarization dependent type optical isolator 1 relating to the present embodiment, the constitution is substantially the same as an ordinary polarization non-dependent type optical isolator, with only the first and second birefringence units 7 and 11 with the different refraction angles being used. Therefore, the constitution is simple.

Because birefringence is utilized for the polarizers (the first and second birefringence units) and there is no absorption of light as in a polarization plate, damage by heat may be prevented even if high power polarized light such as laser light or the like is used.

Because the extraordinary light is emitted toward a position that is offset from the core end face of the output side optical fiber 17 and removed, due to the variations of the refractive indices of the first and second birefringence units 7 and 11, stable polarized light with a high extinction ratio may be obtained.

Wedge type rutile that is used in common polarization non-dependent type optical isolators may be employed in the first and second birefringence units 7 and 11, and just the taper angle thereof varied. Therefore, application costs may be kept down with a simple constitution.

With the taper angles of the first and second birefringence units 7 and 11 being such that $\theta 2 - \theta 1 = 4°$, the refraction angles of the two are made to be greatly different. Therefore, a dimension in the optical axis direction may be made small and a reduction in size of the device may be enabled.

The function of the optical isolator may be provided without components that rotating the polarized light other than the Faraday rotator. Thus, a reduction in the number of components is enabled. In addition, as the birefringence members to be employed, rutile prisms that are members with crystal orientations which are used in ordinary optical isolators may be employed. Therefore, special jigs and special measurement devices are unnecessary, which contributes to a reduction in costs.

Examples of applications of the non-reciprocal unit 21 used for the polarization dependent type optical isolator of the present invention include an optical fiber laser.

An optical fiber laser device is a fundamental laser device that amplifies the intensity of light while propagating the light through an optical fiber. The amplification ratio of light in an optical fiber laser device is 10× to 100× (10 to 20 dB). Therefore, the isolation needs to be at least 10 dB in the polarization dependent type optical isolator of the present invention.

When the non-reciprocal unit 21 used for the polarization dependent type optical isolator is used with this optical fiber laser device, return light in the optical fiber laser device is blocked. Thus, a function is provided that protects optical components from being damaged by the return of strong intensity light that has been amplified in the optical fiber.

If light returns along the optical fiber for light amplification, the returning light is amplified. Therefore, the non-reciprocal unit 21 used for the polarization dependent type optical isolator also has the function of eliminating damage that would make it harder to amplify original light that should be amplified.

Optical fiber laser devices generally have the characteristic that light intensity is strong. If light with this strong light intensity is inputted from outside, the light intensity is excessive for the polarization dependent type optical isolator that uses a related art polarizer. Therefore, the polarization dependent type optical isolator would be damaged. However, by using the non-reciprocal unit 21 used for the polarization dependent type optical isolator of the present embodiment, an effect is provided of preventing damage to high-value optical components such as optical fibers for light amplification, mirror semiconductor lasers and the like.

When the present invention is used, as in the structures and operations described above, special Polarizers are not required, and implementation is possible with simple structures similar to an optical isolator that passes light of only one polarization.

Herebelow, other embodiments of the present invention are described. In the embodiments described below, portions that provide the same operational effects as in the above-described first embodiment are assigned the same reference numerals and hence detailed descriptions of those portions are not given. In the following descriptions, principal points of difference from the above-described first embodiment are described.

A second embodiment of the present invention is described with reference to FIG. 2. This second embodiment differs from the first embodiment in that a wavelength filter 101 is disposed at the input side of the non-reciprocal unit 21 used for the polarization dependent type optical isolator.

The wavelength filter 101 has the function of passing wavelengths that should be passed and reflecting or absorbing wavelengths that should not be passed.

The wavelength filter 101 may be a body coated with a dielectric multilayer optical film, a color filter that contains a substance that absorbs light in a glass material, or the like.

Figure 2:
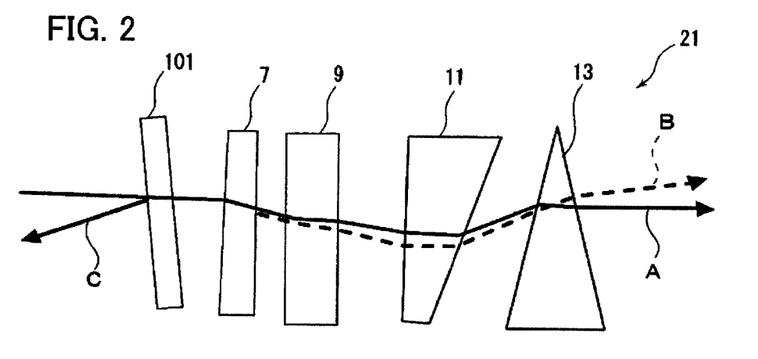
FIG. 2 is a layout diagram of structural members of a non-reciprocal unit used for a polarization dependent type optical isolator relating to a second embodiment.

The location at which the wavelength filter 101 is disposed does not have to be the input side as in FIG. 2; the same objectives may be achieved by placing the wavelength filter 101 at a position between the optical components or at the output side.

In the second embodiment, light from a light source for excitation of an unillustrated optical fiber laser and laser light outputted by the optical fiber laser are inputted into the non-reciprocal unit 21 used for the polarization dependent type optical isolator. The two lights—the light of the light source for excitation (wavelength 800 to 980 nm) and the laser light outputted by the optical fiber laser (1030 to 1090 nm)— generally have different wavelengths. If the light with the two wavelengths were to be outputted from the optical fiber laser and guided to a focusing point by a lens for laser machining, laser welding or the like, a focused image close to the diffraction limit would not be obtained, because of chromatic aberration characteristics of the lens. In a laser machining apparatus, the significance of not obtaining a focused image close to the diffraction limit is that there are significant problems in practical use, such as high-precision machining being difficult, energy being wasted and so forth.

Accordingly, in the present embodiment, the excitation light and output light of the optical fiber laser are separated by the wavelength filter incorporated in the present device, and only the output light is outputted to outside the device.

That is, in FIG. 2, excitation light C and output light A+B are inputted. The excitation light C is reflected by the wavelength filter 101, and the output light A+B is transmitted. The output light A+B that has passed through the wavelength filter 101, similarly to the first embodiment, passes through the first birefringence unit 7, the Faraday rotator 9, the second birefringence unit 11 and the refraction unit 13 for angle correction, is separated into the ordinary light A and extraordinary light B, and the optical rays thereof are emitted at different positions and angles.

Apart from the excitation light C being reflected by the wavelength filter 101, this is the same as in the first embodiment. The position of the optical filter is illustrated as being at the input side, but at other locations too the function of similarly reflecting the excitation light C with the wavelength filter 101 is the same.

A third embodiment of the present invention is described with reference to FIG. 3. In this third embodiment, a half-wavelength plate 102 is disposed at the output side, and the polarization direction of the output light is twisted by 90°. Thus, design to take account of polarization dependencies of external optical components is possible.

Figure 3:
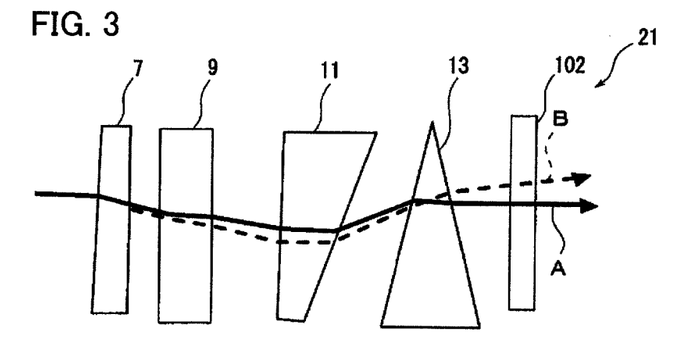
FIG. 3 is a layout diagram of structural members of a non-reciprocal unit used for a polarization dependent type optical isolator relating to a third embodiment.

The location at which the half-wavelength plate 102 is disposed does not have to be at the output side as in illustrated in FIG. 3; the same objectives may be achieved by placing the half-wavelength plate 102 at a position between the optical components or at the input side.

In this third embodiment, the input light passes through the first birefringence unit 7, the Faraday rotator 9, the second birefringence unit 11 and the refraction unit 13 for angle correction, and is separated into the ordinary light A and extraordinary light B. The ordinary light A and extraordinary light B that are emitted at different positions and angles are inputted to the half-wavelength plate 102. In the half-wavelength plate 102, the ordinary light A and extraordinary light B are inputted and may have the polarization directions thereof twisted by 90° in the half-wavelength plate 102.

In this third embodiment too, similarly to the second embodiment, the location at which the wavelength plate 102 is introduced may be any location.

Figure 4A:
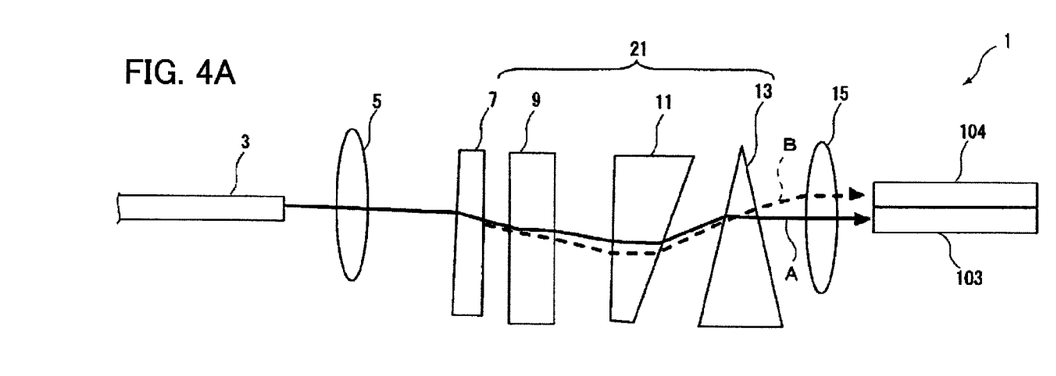
FIG. 4A is a layout diagram of structural members of a polarization dependent type optical isolator relating to a fourth embodiment, illustrating the operation of input light.
Figure 4B:
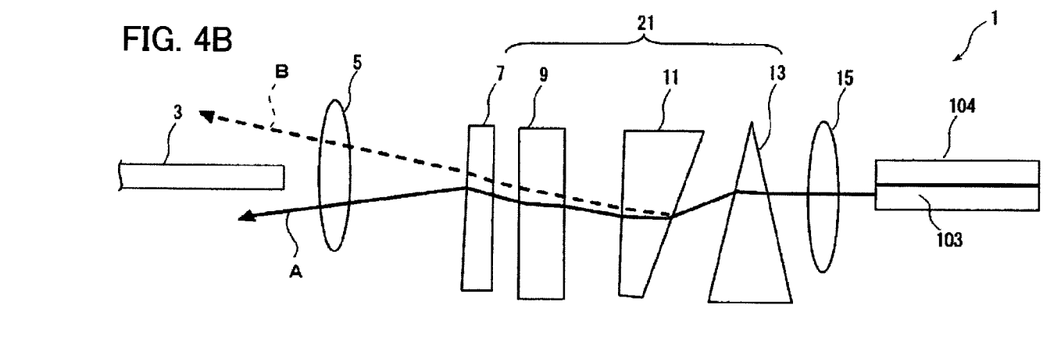
FIG. 4B is a layout diagram of the structural members, illustrating the operation of return light.

A fourth embodiment of the present invention is described with reference to FIGS. 4A and 4B. In FIGS. 4A and 4B, the polarization dependent type optical isolator 1 relating to the fourth embodiment of the present invention differs from that of the first embodiment in that output optical fibers 103 and 104 are disposed in place of the output side optical fiber 17 of the first embodiment.

The optical fibers are disposed at the output side as examples of optical waveguides for outputting the ordinary light and the extraordinary light, respectively. If the light to be used is the ordinary light, the extraordinary light is unneeded. The unneeded light is efficiently released to outside the device by the optical fiber.

Beside an optical fiber, a structure in which the refractive index of a transparent body of glass or the like is altered, a semiconductor laser with an active layer, or the like can be considered for an optical waveguide structures.

The fourth embodiment may provide for the detection of light amount levels of the outputted light.

For input light in this fourth embodiment, functions and operations up to transmission through the second lens 15 are the same as in the first embodiment.

Light inputted from the input side optical fiber 3 passes through the first lens 5, and passes through the first birefringence unit 7, the Faraday rotator 9, the second birefringence unit 11 and the refraction unit 13 for angle correction, and optical rays with different positions and angles according to the two polarizations of the ordinary light A and the extraordinary light B are emitted. After passing through the second lens 15, the ordinary light A is arranged at a proper position and angle to be inputted into the output optical fiber 103, and the extraordinary light B is arranged at a proper position and angle to be inputted into the output optical fiber 104.

If the ordinary light A is to be propagated through the output optical fiber 103 and utilized, the extraordinary light B is propagated through the output optical fiber 104 and characteristics of light that is guided to an unillustrated light detection device are measured. Thus, the integrity of an optical fiber laser device system is verified, light amounts are monitored in order to keep the light amounts stable, the wavelength is monitored, and the like. This is provided for the application of feedback for controlling input currents of a laser diode for an excitation light source, in order to keep light amounts stable, and controlling output light amounts and the like.

The characteristics of the light that are measured by the unillustrated light detection device include light amount, wavelength, pulse width, pulse spacing and pulse shape, or the like. Beside using information on the characteristics of the monitored light to keep a device such as an optical fiber laser or the like stable, the information may be used for verifying the integrity of the device, including failure diagnostics, identifying deteriorating conditions, failure prognostics and the like. It may also be used for forming pulse widths and pulse shapes to a desired shape.

When the light that is to be principally used is the light outputted from the output optical fiber 103, light that is not to be employed is outputted to outside the polarization dependent type optical isolator 1 of the present invention through the output optical fiber 104. Thus, it may be prevented that light is not outputted being absorbed in the device, converted to heat and leading to a rise in temperature of the device interior.

Figure 5A:
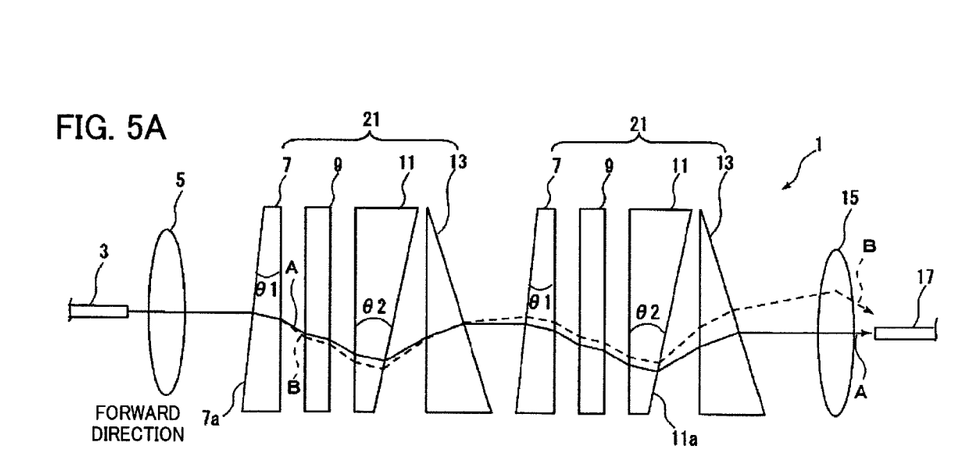
FIG. 5A is a layout diagram of structural members of a polarization dependent type optical isolator relating to a fifth embodiment, illustrating the operation of input light.
Figure 5B:
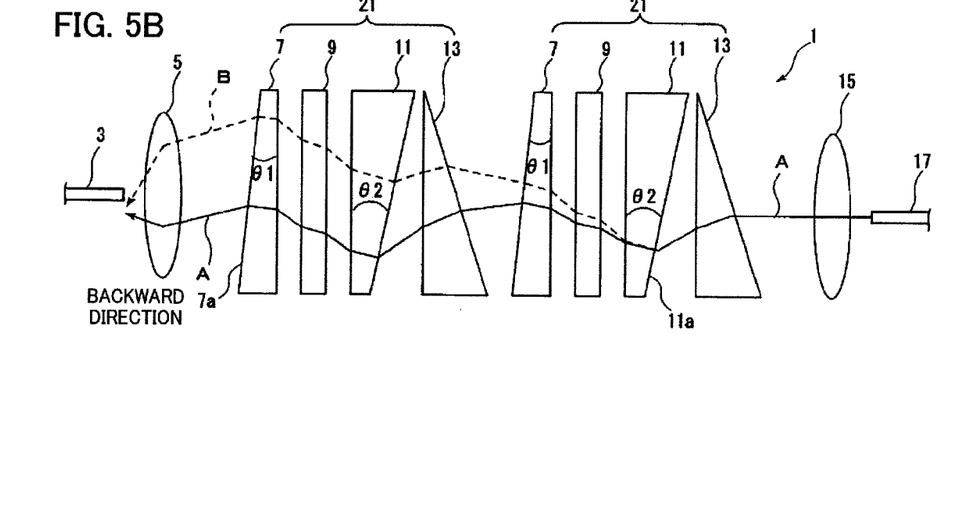
FIG. 5B is a layout diagram of the structural members, illustrating the operation of return light.

A fifth embodiment of the present invention is described with reference to FIG. 5A and FIG. 5B. This fifth embodiment differs from the first embodiment in that two of the non-reciprocal unit 21 used for the polarization dependent type optical isolator formed with the first birefringence unit 7, the Faraday rotator 9, the second birefringence unit 11 and the refraction unit 13 for angle correction are disposed in tandem in the optical axis direction.

According to this fifth embodiment, the separation angle between the ordinary light A and the extraordinary light B is larger than in the first embodiment. Therefore, the extinction ratio may be raised further.

The present invention is not to be limited to the embodiments described above and numerous modifications are possible within a technical scope not departing from the spirit of the present invention. For example, beside optical communications, optical measurements and the like using laser light, the present invention may be used for optical machining, clinical devices and the like using laser light, and may be used as a fiber laser-incorporated optical isolator for stabilization. The optical fibers 3 and 17 are not to be limited to polarization-maintaining and Absorption reducing fibers and may be ordinary optical fibers. The first and second birefringence units 7 and 11 may have the same taper angles and use materials with different refractive index differences between ordinary light and extraordinary light. For example, the taper angles may be made the same, rutile used for the first birefringence unit 7 and quartz used for the second birefringence unit 11.

The invention claimed is:

1. A polarization dependent type optical isolator comprising:
    an input unit formed with a first optical component configured to receive input light;
    an output unit formed with a second optical component; and
    a non-reciprocal unit for a polarization dependent type optical isolator disposed between the input unit and the output unit;
    the non-reciprocal unit for the polarization dependent type optical isolator having a first birefringence unit, a second birefringence unit, and a Faraday rotator disposed between the first birefringence unit and the second birefringence unit;
    wherein both the first birefringence unit and the second birefringence unit are wedge-type birefringence crystal, and wedge angles of the first birefringence unit and the second birefringence unit are different; and
    wherein the second optical component of the output unit includes a first optical waveguide and a second optical waveguide disposed at respective output positions of ordinary light of the input light and extraordinary light of the input light, and wherein light outputted from the first optical waveguide or light outputted from the second optical waveguide is guided to a light detection device, and is used to monitor characteristics of the light.

* * * * *